(12) United States Patent
Scanlon et al.

(10) Patent No.: US 9,316,112 B2
(45) Date of Patent: Apr. 19, 2016

(54) VARIABLE AREA FAN NOZZLE WITH DRIVE SYSTEM HEALTH MONITORING

(75) Inventors: Kevin Robert Scanlon, La Jolla, CA (US); Geoffrey Pinto, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 1064 days.

(21) Appl. No.: 13/333,094

(22) Filed: Dec. 21, 2011

(65) Prior Publication Data

US 2013/0160425 A1  Jun. 27, 2013

(51) Int. Cl.
*F01D 17/02* (2006.01)
*F02K 1/15* (2006.01)
*F02K 1/09* (2006.01)

(52) U.S. Cl.
CPC . *F01D 17/02* (2013.01); *F02K 1/09* (2013.01); *F02K 1/15* (2013.01)

(58) Field of Classification Search
CPC ............. F02K 1/09; F02K 1/566; F02K 1/70; F02K 1/72; F02K 1/763; F02K 1/76; F02K 3/075; F02K 1/15; F01D 17/02
See application file for complete search history.

(56) References Cited

U.S. PATENT DOCUMENTS

| 6,167,694 | B1 * | 1/2001 | Davies | 60/226.2 |
| 2004/0118974 | A1 * | 6/2004 | Colotte et al. | 244/110 B |
| 2009/0013664 | A1 * | 1/2009 | Jones et al. | 60/228 |
| 2009/0288386 | A1 * | 11/2009 | Marshall et al. | 60/204 |
| 2010/0107598 | A1 * | 5/2010 | Marin Martinod et al. | 60/226.2 |

* cited by examiner

*Primary Examiner* — Andrew Nguyen
(74) *Attorney, Agent, or Firm* — O'Shea Getz P.C.

(57) ABSTRACT

A nacelle for a turbofan engine includes a variable area fan nozzle (VAFN) and a proximity sensor that is attached to a nacelle forward portion to sense the presence of the VAFN when stowed. The proximity sensor is not attached to the VAFN, thereby enabling the use of a proximity sensor such as linear variable displacement transformer having a relatively compact operational stroke.

8 Claims, 12 Drawing Sheets

FIG. 13

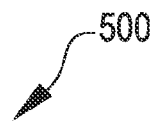

```
┌─────────────────────────────────────────────────────────────────┐
│ DURING A FIRST TIME PERIOD WHEN A FAN NOZZLE IS IN A STOWED     │
│ POSITION RELATIVE TO A MOVABLE SLEEVE OF THE ENGINE AND THE     │
│ SLEEVE IS IN A FORWARD POSITION RELATIVE TO A NACELLE           │
│ FORWARD PORTION OF THE ENGINE, USING A FIRST PROXIMITY          │
│ SENSOR TO DETECT THE PRESENCE OF A FIRST PORTION OF THE         │
│ FAN NOZZLE, THE FIRST PROXIMITY SENSOR BEING ATTACHED TO THE    │
│ NACELLE FORWARD PORTION AND NOT ATTACHED TO THE FAN NOZZLE - 502│
└─────────────────────────────────────────────────────────────────┘
                                  │
┌─────────────────────────────────────────────────────────────────┐
│ ACTUATING A FAN NOZZLE DRIVE SYSTEM OPERATIONALLY COUPLED WITH  │
│ THE FAN NOZZLE TO MOVE THE FAN NOZZLE RELATIVE TO THE SLEEVE    │
│ FROM THE STOWED POSITION TO A DEPLOYED POSITION - 504           │
└─────────────────────────────────────────────────────────────────┘
                                  │
┌─────────────────────────────────────────────────────────────────┐
│ ACTUATING THE FAN NOZZLE DRIVE SYSTEM TO RETURN THE FAN         │
│ NOZZLE FROM THE DEPLOYED POSITION TO THE STOWED POSITION - 506  │
└─────────────────────────────────────────────────────────────────┘
                                  │
┌─────────────────────────────────────────────────────────────────┐
│ ACTUATING A SLEEVE DRIVE SYSTEM OPERATIONALLY COUPLED WITH      │
│ THE SLEEVE TO MOVE THE SLEEVE AND THE FAN NOZZLE RELATIVE TO    │
│ THE NACELLE FORWARD PORTION THEREBY MOVING THE SLEEVE FROM      │
│ A FORWARD POSITION TO AN AFT POSITION RELATIVE TO THE NACELLE   │
│ FORWARD PORTION - 508                                           │
└─────────────────────────────────────────────────────────────────┘
                                  │
┌─────────────────────────────────────────────────────────────────┐
│ ACTUATING THE SLEEVE DRIVE SYSTEM TO RETURN THE SLEEVE FROM     │
│ THE AFT POSITION TO THE FORWARD POSITION - 510                  │
└─────────────────────────────────────────────────────────────────┘
                                  │
┌─────────────────────────────────────────────────────────────────┐
│ DURING A SECOND TIME PERIOD SUBSEQUENT TO RETURNING THE         │
│ FAN NOZZLE TO THE STOWED POSITION AND SUBSEQUENT TO             │
│ RETURNING THE SLEEVE TO THE FORWARD POSITION, USING THE         │
│ FIRST PROXIMITY SENSOR TO DETECT THE PRESENCE OF THE            │
│ FIRST PORTION OF THE FAN NOZZLE - 512                           │
└─────────────────────────────────────────────────────────────────┘
                                  │
                        CONTINUED IN FIG. 14
```

FIG. 14  CONTINUED FROM FIG. 13        500 (CONTINUED)

USING A SECOND PROXIMITY SENSOR TO DETECT THE PRESENCE OF A SECOND PORTION OF THE FAN NOZZLE, THE SECOND PROXIMITY SENSOR BEING ATTACHED TO THE NACELLE FORWARD PORTION AND NOT ATTACHED TO THE FAN NOZZLE - 514

COMPARING A FIRST SIGNAL GENERATED BY THE FIRST PROXIMITY SENSOR WITH A SECOND SIGNAL GENERATED BY THE SECOND PROXIMITY SENSOR TO MONITOR FOR MISALIGNMENT AND/OR DEFECTIVE POSITIONING OF THE FAN NOZZLE - 516

SUPPORTING A FIRST MEMBER OF THE FIRST PROXIMITY SENSOR IN A FIXED POSITION RELATIVE TO THE NACELLE FORWARD PORTION - 518

USING MOTION OF THE FAN NOZZLE RELATIVE TO THE NACELLE FORWARD PORTION TO ARTICULATE A SECOND MEMBER OF THE FIRST PROXIMITY SENSOR RELATIVE TO THE FIRST MEMBER ONLY DURING A SUBSET OF THE TOTAL RANGE OF MOTION BETWEEN THE FAN NOZZLE AND THE NACELLE FORWARD PORTION - 520

GENERATING A FIRST SIGNAL INDICATIVE OF A POSITION OF THE SECOND MEMBER RELATIVE TO THE FIRST MEMBER - 522

USING A SLAVE LINK SUPPORTED BY THE SLEEVE TO COMMUNICATE A MOVEMENT OF THE FAN NOZZLE TO THE SECOND MEMBER - 524

TRANSFERRING AN ACTUATION MOTION FROM A DRIVE SOURCE THROUGH A MECHANICAL INTERCONNECTION TO A PLURALITY OF FAN NOZZLE ACTUATORS OPERATIVELY COUPLED WITH THE FAN NOZZLE - 526

GENERATING A FIRST CONFIGURATION SIGNAL INDICATIVE OF THE CONFIGURATION OF THE MECHANICAL INTERCONNECTION AT A FIRST LOCATION - 528

GENERATING A SECOND CONFIGURATION SIGNAL INDICATIVE OF THE CONFIGURATION OF THE MECHANICAL INTERCONNECTION AT A SECOND LOCATION - 530

COMPARING THE FIRST AND SECOND CONFIGURATION SIGNALS TO MONITOR THE MECHANICAL INTERCONNECTION - 532

COMPARING A FIRST SIGNAL GENERATED BY THE FIRST PROXIMITY SENSOR WITH AT LEAST ONE OF THE FIRST CONFIGURATION SIGNAL OR THE SECOND CONFIGURATION SIGNAL TO MONITOR THE FAN NOZZLE DRIVE SYSTEM DOWNSTREAM OF AT LEAST ONE OF THE FIRST LOCATION OR THE SECOND LOCATION - 534

VARIABLE AREA FAN NOZZLE WITH DRIVE SYSTEM HEALTH MONITORING

BACKGROUND

Typical aircraft turbofan jet engines include an engine core, a nacelle that surrounds the engine core, and a fan that draws in a flow of air that is split into bypass airflow and engine core airflow. The nacelle provides a bypass duct that surrounds the engine core. The bypass airflow is transported through the bypass duct. The nacelle is configured to promote laminar flow of air through the bypass duct. The engine core includes a multi-stage compressor to compress the engine core airflow, a combustor to add thermal energy to the compressed engine core airflow, and a turbine section downstream of the combustor to produce mechanical power from the engine core airflow. The typical turbine section has two and sometimes three turbine stages. The turbine stages are used to drive the compressor and the fan. After exiting from the turbine section, the engine core airflow exits through an exhaust nozzle at the aft end of the engine.

In a turbofan engine, the fan typically produces a majority of the thrust produced by the engine. The bypass airflow can be used to produce reverse thrust typically used during landing. Thrust reversers mounted in the nacelle selectively reverse the direction of the bypass airflow to generate reverse thrust. During normal engine operation, the bypass airflow may or may not be mixed with the exhausted engine core airflow prior to exiting the engine assembly.

Several turbofan engine parameters have a significant impact upon engine performance. Bypass ratio (BPR) is the ratio of the bypass airflow rate to the engine core airflow rate. A high BPR engine (e.g., BPR of 5 or more) typically has better specific fuel consumption (SFC) and is typically quieter than a low BPR engine of equal thrust. In general, a higher BPR results in lower average exhaust velocities and less jet noise at a specific thrust. A turbofan engine's performance is also affected by the engine's fan pressure ratio (FPR). FPR is the ratio of the air pressure at the engine's fan nozzle exit to the pressure of the air entering the fan. A lower FPR results in lower exhaust velocity and higher propulsive efficiency. Reducing an engine's FPR can reach a practical limit, however, as a low FPR may not generate sufficient thrust and may cause engine fan stall, blade flutter, and/or compressor surge under certain operating conditions.

One approach for optimizing the performance of an engine over various flight conditions involves varying the fan nozzle exit area. By selectively varying the fan nozzle's exit area, an engine's bypass flow characteristics can be adjusted to better match a particular flight condition, for example, by optimizing the FPR relative to the particular thrust level being employed. Variable area fan nozzle (VAFN) systems, however, typically include multiple components that are selectively repositioned relative to the nacelle via one or more actuation systems.

To satisfy operational, safety, and certification requirements (e.g., Federal Aviation Administration requirements and European Aviation Safety Agency requirements), a VAFN system must satisfy structural damage tolerance and system reliability requirements. To satisfy system reliability requirements it may be necessary to monitor the VAFN system to detect, for example, actuation system failures that may result in degraded aircraft performance such as increased drag and/or decreased engine performance. Such monitoring, however, should be sufficiently reliable, which may be difficult to achieve with VAFN systems having multiple components that are selectively repositioned relative to the nacelle via one or more actuation systems.

Accordingly, VAFN systems that employ reliable monitoring are desirable, especially where the monitoring is accomplished in a simple and cost effective manner.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Turbofan engine nacelles are disclosed that include a variable area fan nozzle (VAFN) system having drive system health monitoring. In many embodiments, the drive system health monitoring employs proximity sensors mounted to the engine nacelle to periodically verify that predetermined portions of a movable fan nozzle are positioned consistent with a stowed configuration of the fan nozzle. By periodically verifying (e.g., twice per flight) the position of the predetermined portions of the fan nozzle, the required system reliability of the VAFN system can be satisfied in a simple and cost effective manner.

Thus, in one aspect, a nacelle for a turbofan engine is provided. The nacelle includes a nacelle forward portion, a sleeve, a fan nozzle, and a first proximity sensor attached to the nacelle forward portion. The nacelle forward portion at least partially defines a bypass duct configured to transport bypass airflow of the engine. The nacelle forward portion has an aft edge that at least partially surrounds the bypass duct. The sleeve is movable disposed aft of the nacelle forward portion aft edge and has a trailing edge. The sleeve is movable relative to the nacelle forward portion between a forward position and an aft position. The fan nozzle has a leading edge and a trailing edge. A primary flow exit for bypass airflow of the engine is partially defined by the fan nozzle trailing edge. The fan nozzle is disposed behind the sleeve trailing edge and movable relative to the sleeve between a stowed position and a deployed position. The fan nozzle has a total range of motion relative to the nacelle forward portion between a forward-most position and an aft-most position. The forward-most position occurs when the sleeve is in the forward position and the fan nozzle is in the stowed position. The aft-most position occurs when the sleeve is in the aft position and the fan nozzle is in the deployed position. The total range of relative motion is divided into a first portion and a second portion. The first proximity sensor is not attached to the fan nozzle or to the sleeve. The first proximity sensor generates a first signal that is indicative of when the fan nozzle is in the first portion of the total range of relative motion and indicative of when the fan nozzle is not in the first portion of the total range of relative motion. In many embodiments, the first signal does not change in response to a change in the position of the fan nozzle within the second portion of the total range of relative motion.

In many embodiments, a variable area fan nozzle (VAFN) port is defined between the sleeve trailing edge and the fan nozzle leading edge when the fan nozzle is in the deployed position. The VAFN port provides an additional flow exit for bypass airflow of the engine flowing through the bypass duct other than the primary flow exit.

In many embodiments, a movement of the fan nozzle relative to the nacelle forward portion varies an exit area of the primary flow exit. For example, the fan nozzle and the nacelle forward portion can cooperate to define the primary flow exit such that moving the fan nozzle relative to the nacelle forward portion varies the geometry of the primary flow exit so as to vary the exit area of the primary flow exit.

In many embodiments, the first proximity sensor includes a first member and a second member that is movable relative to the first member. The first member can have a fixed position relative to the nacelle forward portion and the second member can interface with the fan nozzle only when the fan nozzle is disposed within the first portion of the total range of relative motion. For example, the proximity sensor can include a linear variable differential transformer (LVDT) in which the second member (e.g., a plunger) is biased into an extended position relative to the first member when the fan nozzle is not disposed within the first portion of the total range of relative motion. In many embodiments, the first signal changes in response to a change in the position of the fan nozzle relative to the nacelle forward portion within the first portion of the total range of relative motion. And the first proximity sensor can be configured to accommodate variability in the position of the forward-most position relative to the nacelle forward position.

In many embodiments, the nacelle includes a second proximity sensor, which is also attached to the nacelle forward portion and not attached to the fan nozzle. The second proximity sensor generates a second signal that is indicative of when the fan nozzle is in the first portion of the total range of relative motion and indicative of when the fan nozzle is not in the first portion of the total range of relative motion. The nacelle can include a means to compare the first signal to the second signal, for example, to monitor for misalignment and/or defective positioning of the fan nozzle.

The nacelle can include a slave link (e.g., a slave plunger) mounted to the sleeve. The slave link is movable relative to the sleeve and interfaces with the fan nozzle only when the fan nozzle is disposed within the first portion of the total range of relative motion so as to communicate a position of the fan nozzle to the first proximity sensor.

In many embodiments, the nacelle includes a slave link assembly configured to be detachably mounted to the sleeve. The slave link assembly includes a slave plunger, a housing, and a spring (e.g., a compression spring). The housing is configured to be detachably mounted to the sleeve. The spring biases the slave plunger into an extended configuration relative to the housing absent contact with the fan nozzle. The slave plunger interfaces with the fan nozzle only when the fan nozzle is disposed within the first portion of the total range of relative motion so as to communicate a position of the fan nozzle to the first proximity sensor.

In many embodiments, the first portion of the total range of relative motion is smaller than the second portion. For example, the first portion can be less than 25% of the total range of relative motion. The first portion can also be less than 10% of the total range of relative motion. And the first portion can even be less than 5% of the total range of relative motion.

In many embodiments, the nacelle further includes a plurality of fan nozzle actuators, a mechanical interconnection, a first configuration sensor generating a first configuration signal, a second configuration sensor generating a second configuration signal, and a means to compare the first configuration signal to the second configuration signal. The fan nozzle actuators are configured to selectively move the fan nozzle relative to the sleeve between the stowed position and the deployed position. The mechanical interconnection connects a drive source to the fan nozzle actuators to transfer an actuation motion from the drive source to the fan nozzle actuators. The drive source actuates the mechanical interconnection through a range of configurations between a stowed configuration corresponding to the stowed position of the fan nozzle and a deployed configuration corresponding to the deployed position of the fan nozzle. The first configuration sensor generates a first configuration signal indicative of the configuration of a first location of the mechanical interconnection. The second configuration sensor generates a second configuration signal indicative of the configuration of a second location of the mechanical interconnection. The first and second configuration signals can be compared to, for example, monitor for disconnects in the mechanical interconnection between the first and second locations of the mechanical interconnection. In many embodiments, each of the first and second configurations sensors includes a rotary variable differential transformer (RVDT).

In another aspect, a method is provided for monitoring a movable fan nozzle of a turbofan engine. The method includes using a first proximity sensor, during a first time period when the fan nozzle is in a stowed position relative to a movable sleeve of the turbofan engine and the movable sleeve is in a forward position relative to a nacelle forward portion of the turbofan engine, to detect the presence of the first portion of the fan nozzle. The first proximity sensor is attached to the nacelle forward portion and not attached to the fan nozzle or to the sleeve. A fan nozzle drive system operationally coupled with the fan nozzle is actuated to move the fan nozzle relative to the sleeve from the stowed position to a deployed position. The fan nozzle drive system is actuated to return the fan nozzle from the deployed position to the stowed position. A sleeve drive system operationally coupled with the sleeve is actuated to move the sleeve and the fan nozzle relative to the nacelle forward portion thereby moving the sleeve from a forward position to an aft position relative to the nacelle forward portion. The sleeve drive system is actuated to return the sleeve from the aft position to the forward position. During a second time period after returning the fan nozzle to the stowed position and after returning the sleeve to the forward position, the first proximity sensor is used to detect the presence of the first portion of the fan nozzle.

In many embodiments, the method for monitoring a movable fan nozzle includes using a second proximity sensor to detect the presence of a second portion of the fan nozzle. The second proximity sensor is attached to the nacelle forward portion and not attached to the fan nozzle or to the sleeve. In many embodiments, a first signal generated by the first proximity sensor is compared with a second signal generated by the second proximity sensor to, for example, monitor for misalignment and/or defective positioning of the fan nozzle.

In many embodiments, the first proximity sensor used in the method for monitoring a movable fan nozzle includes a first member and a second member that is movable relative to the first member. For example, the method can include supporting the first member of the first proximity sensor in a fixed position relative to the nacelle forward portion. Relative motion between the fan nozzle and the nacelle forward portion is used to articulate the second member relative to the first member only during a subset of a total range of relative motion between the fan nozzle and the nacelle forward portion. In many embodiments, the subset is less than 25% of the total range of relative motion. The method can include generating a first signal indicative of a position of the second member relative to the first member.

In many embodiments, the method for monitoring a movable fan nozzle uses a slave link supported by a sleeve of the turbofan engine to communicate a movement of the fan nozzle to the second member of the first proximity sensor. The sleeve is movable relative to the nacelle forward portion between a forward position and an aft position. And the fan nozzle is movable relative to the sleeve between a stowed configuration and a deployed position.

In many embodiments, the method for monitoring a movable fan nozzle includes transferring an actuation motion from a drive source through a mechanical interconnection to a plurality of fan nozzle actuators operatively coupled with the fan nozzle. The method can further include generating a first configuration signal indicative of the configuration of the mechanical interconnection at a first location, generating a second configuration signal indicative of the configuration of the mechanical interconnection at a second location, and comparing the first and second configuration signals to monitor the mechanical interconnection (e.g., for malfunctions). And the method can further include comparing a first signal generated by the first proximity sensor with at least one of the first configuration signal or the second configuration signal to monitor the fan nozzle drive system downstream of at least one of the first location or the second location.

For a fuller understanding of the nature and advantages of the present invention, reference should be made to the ensuing detailed description and accompanying drawings.

BRIEF DESCRIPTION OF THE DRAWINGS

FIG. 13 is a simplified diagram showing acts of a method for monitoring a VAFN of a turbofan engine, in accordance with many embodiments.

FIG. 14 is a simplified diagram showing optional acts that can be accomplished in the method of FIG. 13, in accordance with many embodiments.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention can be practiced without the specific details. Furthermore, well-known features may be omitted or simplified in order not to obscure the embodiment being described.

Figure 1:
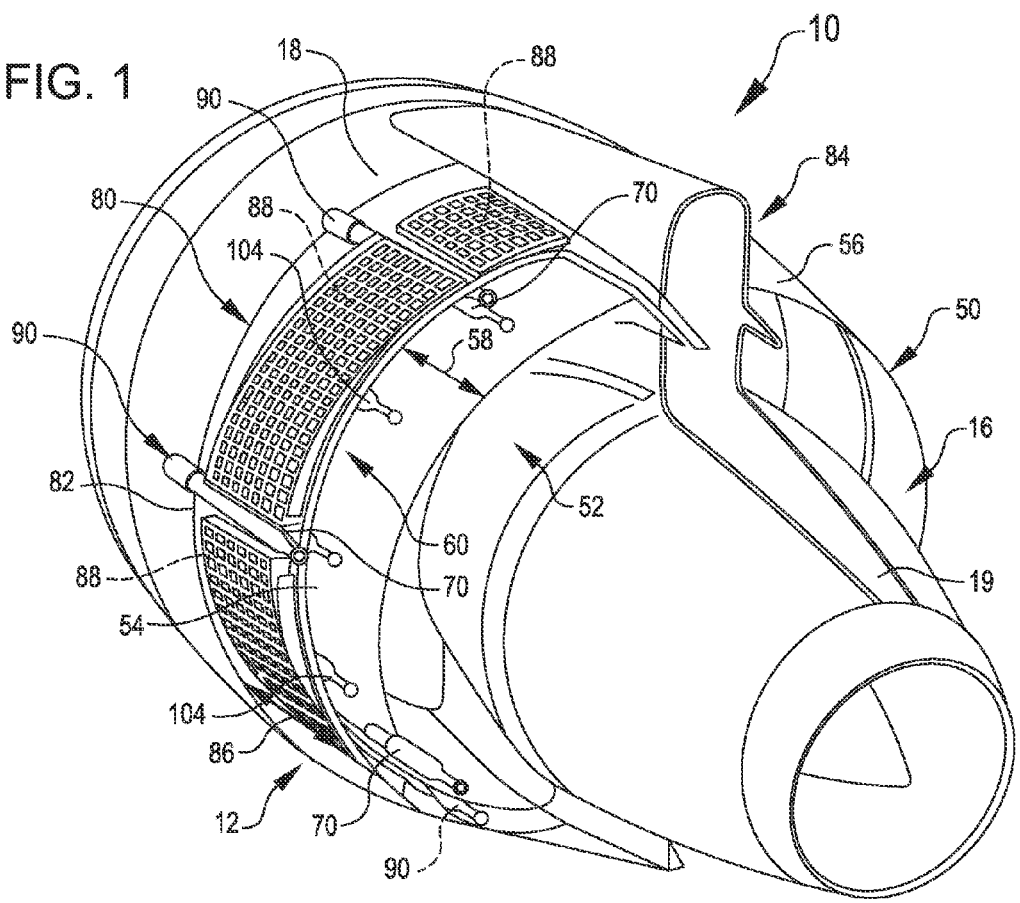
FIG. 1 is a perspective view illustration of a turbofan engine that includes a variable area fan nozzle (VAFN) assembly, in accordance with many embodiments.
Figure 2:
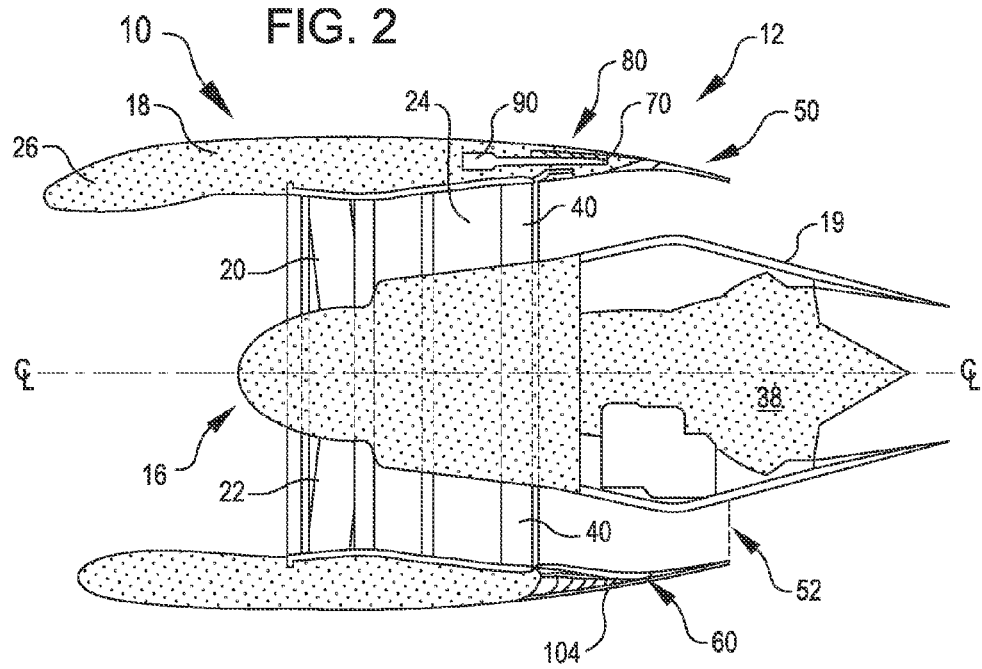
FIG. 2 is a cross-sectional view of the turbofan engine of FIG. 1.

Referring now to the drawings, in which like reference numerals represent like parts throughout the several views, FIG. 1 shows a turbofan engine 10 that includes a variable area fan nozzle (VAFN) assembly 12 having a translating fan nozzle 50 that can be selectively adjusted, for example, as the engine 10 operates under different flight conditions. As discussed above, such an adjustment can be used to optimize the engine's performance. As shown in FIG. 2, the translating fan nozzle 50 can be selectively translated (i.e., moved fore and aft) to vary the fan nozzle's exit area 52 and to adjust how much of the bypass airflow exits through an upstream exit 60 formed by the VAFN assembly 12. For example, when the translating fan nozzle 50 is in the stowed position, the upstream exit 60 is closed and the exit area 52 is minimized, thereby maximizing the fan pressure ratio (FPR) for a particular operational condition. And when the translating fan nozzle 50 is in the fully deployed position, the upstream exit 60 opening is maximized and the exit area 52 is maximized, thereby minimizing the FPR for the particular operational condition. Accordingly, selectively positioning the translating fan nozzle 50 can be used to selectively vary the FPR. And varying the FPR can be used to optimize engine performance, increase fan stall margins, avoid engine malfunction, and/or avoid engine shutdown. For purposes of illustration, the VAFN assembly 12 is shown in the context of a turbofan aircraft engine 10. The engine 10 can be mounted to a wing or fuselage of an aircraft, for example, by a pylon or other similar support (not shown in the figures).

The engine 10 includes an engine core 16 and a nacelle 18. The engine core 16 is housed in a core cowl 19. As shown in FIG. 2, a fan 20 is mounted adjacent to an upstream end of the nacelle 18, and includes a series of fan blades 22 that are rotated about the engine centerline CL during engine operation so as to draw a flow of air into an inlet end 26 of the engine 10. An annular bypass duct 24 is defined between the engine core 16 and the nacelle 18. The airflow drawn into the engine 10 is accelerated by the rotating fan blades 22. A portion of the airflow is directed into and through a multi-stage compressor (not illustrated) within the engine core 16. The engine core airflow through the engine core 16 is initially passed through the compressor to increase the airflow pressure, after which the pressurized air is passed through a combustor (not shown), where it is mixed with fuel and the mixture ignited. The combustion of the fuel and air mixture within the combustor causes the air to expand, which in turn drives a series of turbines at the rear of the engine, indicated generally at 38, to rotate and in turn to provide power to the fan 20.

The bypass airflow accelerated by the rotating fan blades 22 passes through the bypass duct 24, past stators 40, and out through the nozzle assembly 12. The fan 20 produces most of the engine thrust. The high pressure heated exhaust gases from the combustion of the fuel and air mixture are directed out of the rear of the engine core 16 downstream of the turbine section 38.

Figure 3:
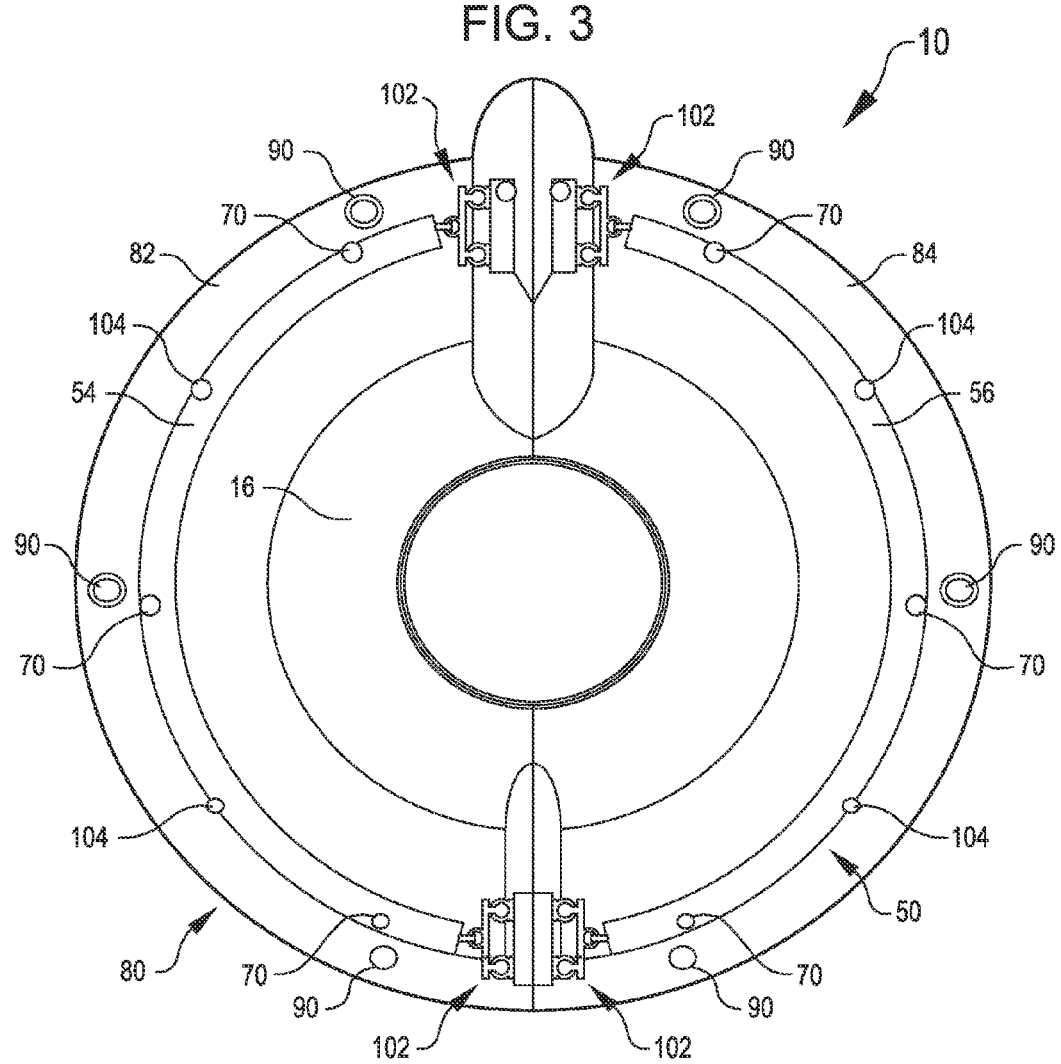
FIG. 3 is an end view of the turbofan engine of FIG. 1.

The translating fan nozzle 50 can include a ring-like annular airfoil structure mounted at the trailing end of a thrust reverser 80, adjacent to and circumscribing the engine core cowl 19. The area between the trailing edge of the translating fan nozzle 50 and the core cowl 19 defines the nozzle exit area 52 for the translating fan nozzle 12. As shown in FIG. 1 and FIG. 3, the translating fan nozzle 50 includes an arcuate first ring section 54 and an arcuate second ring section 56. Each ring section 54, 56 is axially translatable in the direction of the bidirectional arrow 58. Translation of the fan nozzle 50 effects a desired size of the upstream exit 60 and varies the outlet geometry and exit area 52 of the fan nozzle 12 outlet for the engine bypass airflow. The fan nozzle 50 can be translated, for example, by a plurality of ring actuators 70.

The thrust reverser 80 is adjacent to and forward of the translating fan nozzle 50 to block and redirect the bypass airflow in the bypass duct 24 into a thrust reversing vector. In FIG. 1, the thrust reverser 80 and the translating fan nozzle 50 are in stowed (closed) positions. The thrust reverser 80 includes an arcuate first sleeve (cowl) section 82 and an opposed arcuate second sleeve (cowl) section 84 (shown in FIG. 3). The thrust reverser sleeve sections 82, 84 are axially translatable in the direction of the bidirectional arrow 86 by a plurality of sleeve actuators 90. The thrust reverser sleeve sections 82, 84 are translatable over a series of cascade vanes 88. The cascade vanes 88 are indicated by dashed lead lines in FIG. 1 because they are not visible when the thrust reverser 80 is in the stowed position. Axial translation of the sleeve sections 82, 84 in the fore and aft directions allows the bypass airflow to pass through the cascade vanes 88 to generate a thrust-reversing vector.

FIG. 3 is a cross-sectional view of the aft end of the engine 10, and illustrates the arrangement of the ring and sleeve actuators 70, 90, respectively, around the periphery of the engine 10. As shown in FIG. 1, and more clearly in FIG. 3, the sleeve half section 82 and the ring section 54 cooperate to generally define an approximately 180 degree sector of the combined thrust reverser and translating fan nozzle. Likewise, sleeve half section 84 and ring half section 56 cooperate to generally define an opposed approximately 180 degree sector of the thrust reverser and translating fan nozzle. Together, these approximate 180 degree sectors cooperate to define the entire approximate 360 degree thrust reverser and translating fan nozzle.

As shown in FIGS. 1-3, each thrust reverser sleeve half-section 82, 84 of the thrust reverser 80 is translated by one or more (three are shown) peripherally-spaced sleeve actuators 90 fixedly mounted on the nacelle 18. In the embodiment shown, three actuators 90 are used for each sleeve half-section 82, 84. Each ring section 54, 56 of the translating fan nozzle 50 similarly is translated by one or more (three are shown) peripherally-spaced ring actuators 70. Ring actuators 70 can be mounted on an adjacent thrust reverser sleeve section 82, 84, respectively. The ring actuators 70 can be powered by, for example, electricity, mechanical means, pneumatics, hydraulics, or other suitable means, with appropriate power cables and conduits (not shown) passing via pre-defined passages between or above the thrust reverser cascade boxes or pivot doors. The number and arrangement of ring and sleeve actuators 70, 90 can be varied, for example, according to the thrust reverser and translating fan nozzle configuration, and according to other factors. The ring sections 54, 56 may be mounted in, for example, upper and lower guide structures 102 located at each end of corresponding sleeve sections 82, 84, respectively. Guide tubes 104 may be mounted in the nacelle 18 and may extend into the ring sections 54, 56 to stabilize the ring sections 54, 56 against undesirable translation and/or vibration. Guide tubes can alternatively be mounted in the thrust reverser 80.

The translating fan nozzle 50 can be a continuous (e.g., one-piece) or, as shown in FIG. 3, a continuing (e.g., split or multi-section) generally annular ring having an airfoil cross section. Accordingly, the upstream exit 60 (formed when the translating fan nozzle 50 moves in the aft direction away from the sleeve sections 82, 84) can have the form of a generally annular gap extending around the perimeter of the rear of the nacelle 18. Other outlet shapes can also be used, for example, oval, etc. The generally annular gap between the ring sections 54, 56 and the sleeve sections 82, 84 can be continuous, for example, or interrupted at one or more locations, such as, for example, at points of bifurcation or other separation of the translating fan nozzle 50. The bypass duct 24 may also be interrupted at one or more locations.

Figure 4:
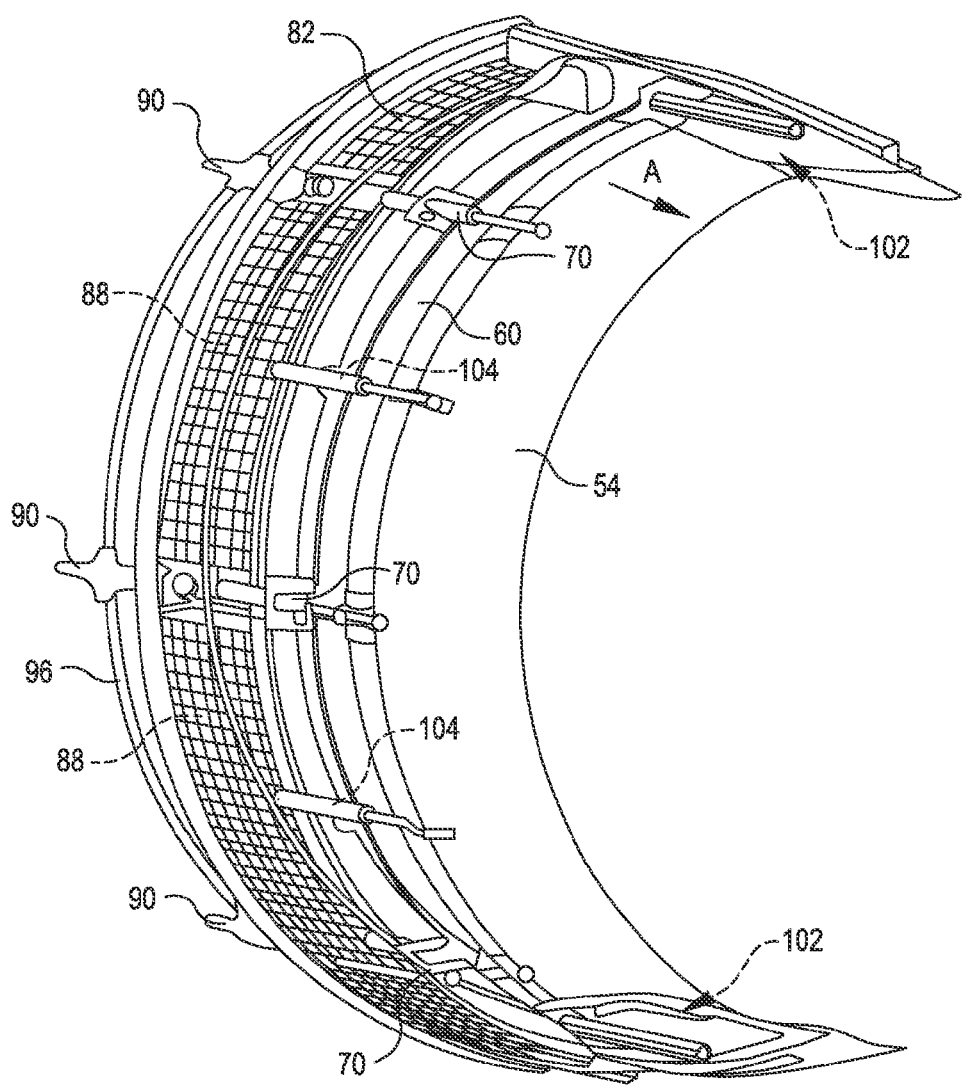
FIG. 4 is a perspective view that shows a portion of the VAFN assembly of the turbofan engine of FIG. 1.
Figure 5:
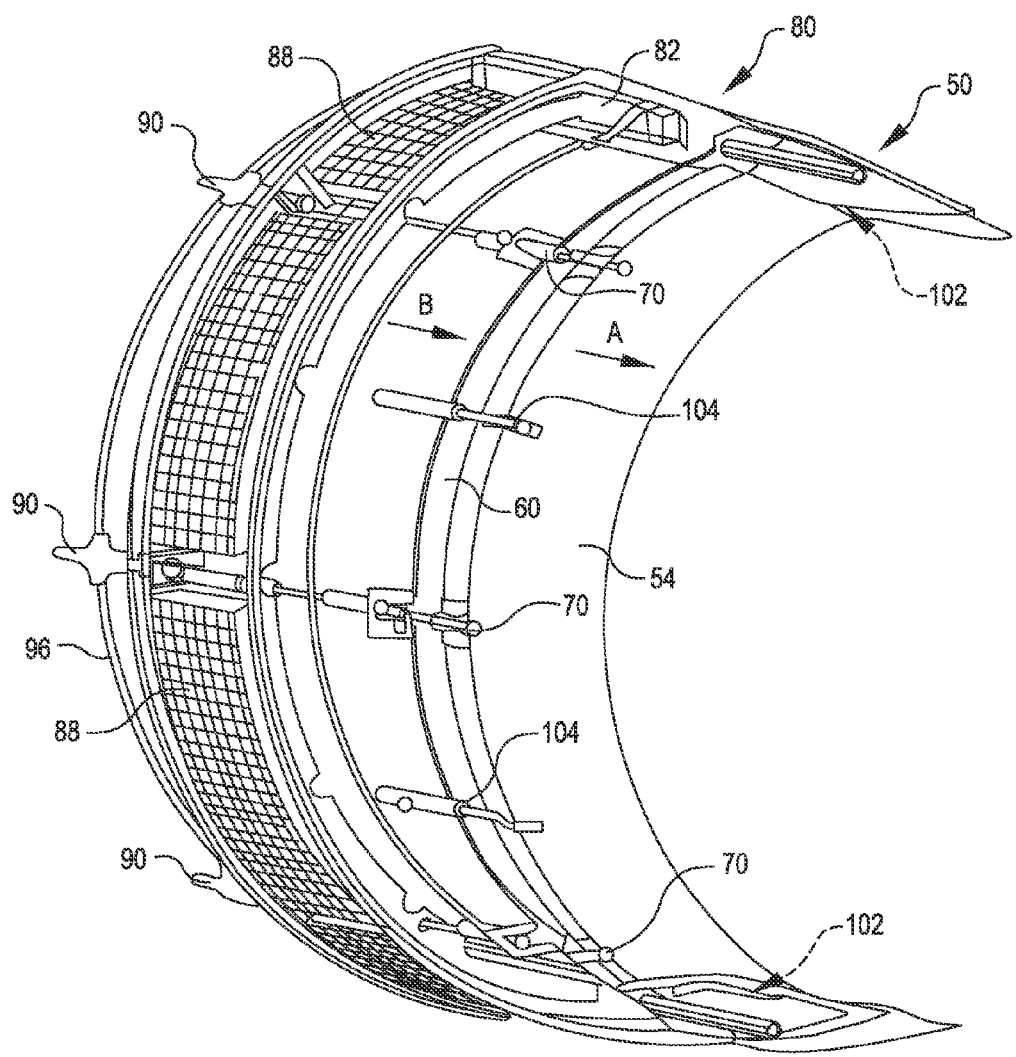
FIG. 5 is another perspective view that shows a portion of the VAFN assembly of the turbofan engine of FIG. 1.

The translating fan nozzle 50 and surrounding structure are described below with reference to FIG. 4 and FIG. 5. In FIG. 4 and FIG. 5, elements that are obscured or partially obscured due to intervening elements are indicated by dashed lead lines.

FIG. 4 is a partial view of the mounting structure for a first ring section 54 of the translating fan nozzle 50 and the corresponding, adjacent first sleeve section 82 of the thrust reverser 80. The second ring section 56 of the translating fan nozzle 50 and the second sleeve section 84 of the thrust reverser 80, which are shown in FIG. 1 and FIG. 3, can be mounted in a similar manner. In FIG. 4, the thrust reverser 80 is in a stowed position, covering the cascade vanes 88. The translating fan nozzle 50 is in an open or deployed position so that an upstream exit 60 is defined between the first ring section 54 and the first sleeve section 82. The rearward axial translation of the first ring section 54 to the deployed position is indicated by the arrow A. The ring actuators 70 can extend from the sleeve section 82, across the upstream exit 60, and connect to a fore end of the ring section 54. The guide tubes 104 can also extend from the sleeve section 82, across the upstream exit 60, and connect to the fore end of the ring section 54. A sleeve actuation cable 96 can connect to each sleeve actuator 90 to provide simultaneous actuation of each actuator 90.

FIG. 5 shows the thrust reverser 80 in a deployed position and the translating fan nozzle 50 in the open position. The rearward axial translation of the first sleeve section 82 from the position shown in FIG. 4 to the deployed position is indicated by the arrow B. Rearward translation of the sleeve section 82 exposes the cascade vanes 88 during operation of the thrust reverser 80. The ring section 54 can also be translated aft during operation of the thrust reverser 80, as shown in this embodiment. The ring section 54 may be deployed at the same time that the thrust reverser 80 is deployed, or they may be deployed at different times.

Figure 6:
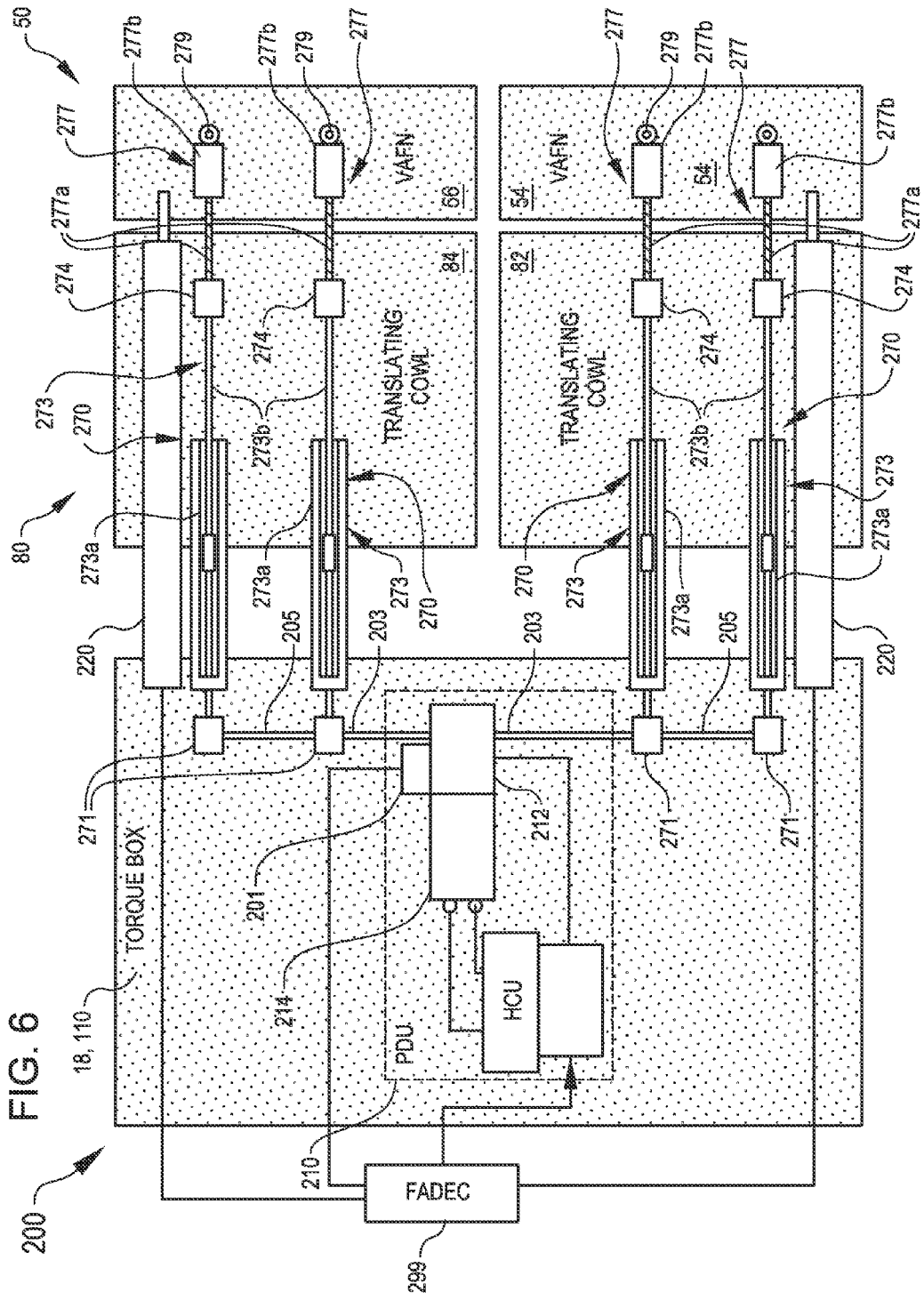
FIG. 6 is a schematic diagram showing a VAFN system that includes linear variable differential transformers (LVDTs) connected between a nacelle forward portion and VAFNs to monitor the positions of the VAFNs, in accordance with many embodiments.

FIG. 6 is a schematic diagram of a VAFN actuation system 200 that incorporates a plurality of VAFN actuators 270, in accordance with many embodiments. The actuation system 200 can be used in the turbofan engine 10 having the cascade-type thrust reverser 80 as described herein, and to translate one or more fan nozzle segments 54, 56 between their stowed and deployed positions. In the VAFN actuation system 200, the pair of translating thrust reverser sleeve sections 82, 84 are movably disposed aft of the nacelle 18, and the pair of translating fan nozzle segments 54, 56 are movably disposed aft of the sleeve sections 82, 84. Each fan nozzle segment 54, 56 is positioned in its stowed and deployed positions by the VAFN actuators 270. Each VAFN actuator 270 can include a gear box 271, a telescoping coupling 273 having a non-translating portion 273a and a translating portion 273b, an inline coupling 274, and an extensible portion 277 having an extensible sleeve 277b. The telescoping coupling 273 permits fore and aft movement of the thrust reverser sleeve sections 82, 84 while maintaining rotational engagement between the gear box 271 and the inline coupling 274. The longitudinal axes of the telescoping coupling 273 and the extensible portion 277 are axially aligned, and the coupling 273 and extensible portion 277 are directly connected together without any intervening gears or transmission. Accordingly, the rotational speed and/or output torque provided to the extensible portion 277 by the inline coupling 274 is substantially the same as the rotational speed and/or torque provided to the coupling 274 by the gear box 271 and the telescoping coupling 273.

As shown in FIG. 6, the VAFN actuators 270 are connected to a power drive unit (PDU) 210. Flexible drive shafts 203 rotatably connect adjacent gear boxes 271 to the PDU 210. And flexible transmission shafts 205 rotatably connect non-adjacent gear boxes 271 to the PDU 210. The PDU 210 includes a power gear box 212 driven by a motor 214. When actuated, the PDU 210 drives the shafts 203, 205 and interconnected gear boxes 271, thereby simultaneously actuating the VAFN actuators 270 and effecting desired simultaneous movement of the fan nozzle segments 54, 56 in a forward or aft direction. The non-translating portion 273a and the movable portion 273b of the actuators 270 can be rotatably coupled together by a suitable splined coupling configured to allow relative translation between the rotationally coupled components.

FIG. 6 also shows a schematic representation of a control system for the VAFN actuation system 200. In the embodiment shown, linear variable displacement transducers (LVDTs) 220 are connected at one end to the nacelle 18 and at the other end to the fan nozzle segments 54, 56. The LVDTs 220 detect the positions of the fan nozzle segments 54, 56 relative to the nacelle 18. The LVDTs 220 can be connected to an automatic control system 299 that controls operation of the PDU 210. For example, the LVDTs 220 can be operably connected to a Full Authority Digital Engine Control (FADEC) system. Inputs from the LVDTs 220 can be used by the control system 299 to monitor the position of the fan nozzle segments 54, 56, and to control operation of the PDU 210 accordingly. The positional monitoring provided by the LVDTs can also be accounted for to demonstrate compliance with overall VAFN system operational and reliability requirements. Alternatively or in addition, the PDU 210 can be equipped with one or more rotary variable displacement transformers (RVDTs) 201 to detect when predetermined rotational displacement limits for the PDU 210 have been reached.

The LVDTs 220, however, must be long enough to accommodate the total stroke of the fan nozzle segments 54, 56 relative to the nacelle 18. One approach for reducing the size of the LVDTs used to monitor the fan nozzle segments 54, 56 is to couple the LVDTs between the thrust reverser sleeve sections 82, 84 and the fan nozzle segments 54, 56.

Figure 7:
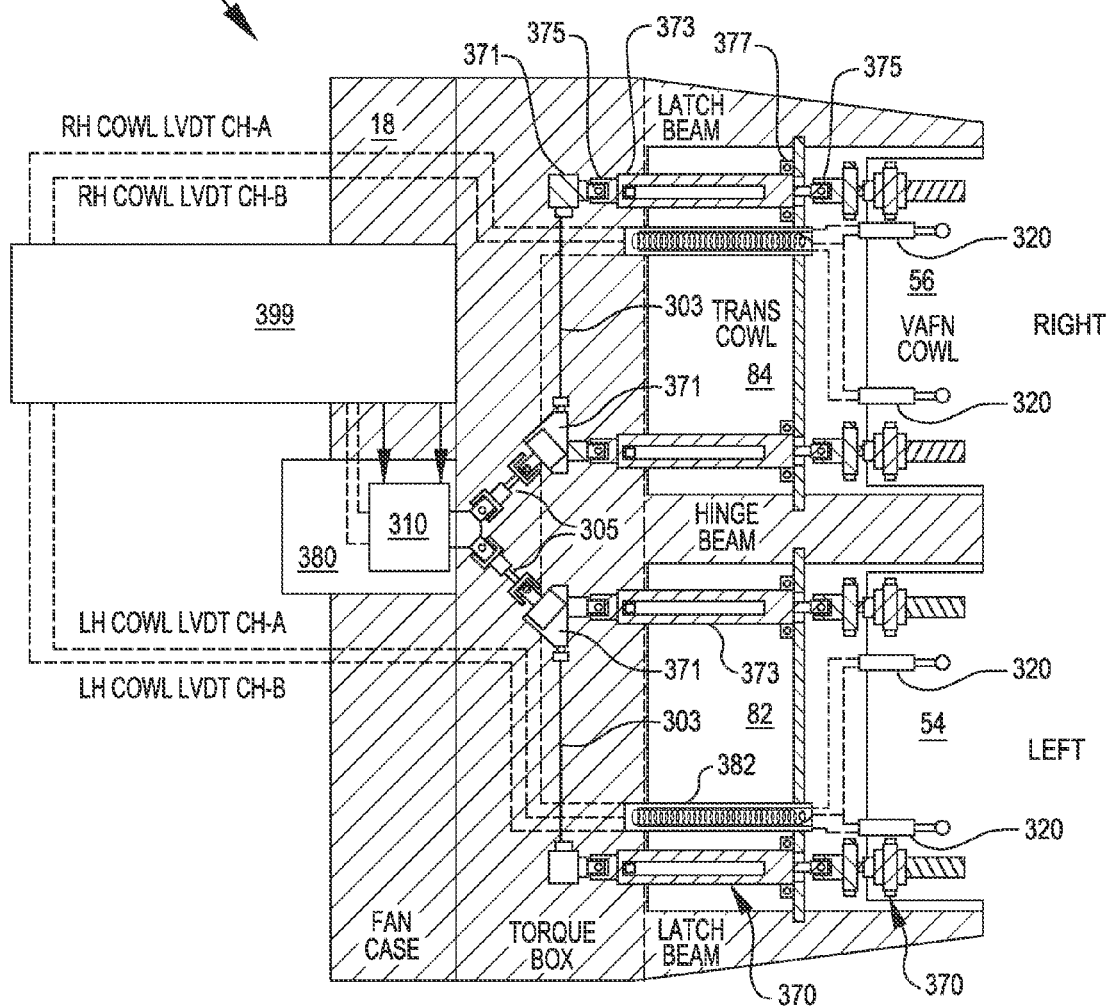
FIG. 7 is a schematic diagram showing a VAFN system that includes LVDTs connected between translating thrust reverser sleeves and VAFNs to monitor the positions of the VAFNs, in accordance with many embodiments.

FIG. 7 is a schematic diagram of a VAFN actuation system 300 that incorporates a plurality of VAFN actuators 370 that are connected between the thrust reverser sleeve sections 82, 84 and the fan nozzle segments 54, 56, in accordance with many embodiments. The actuation system 300 can be used in the turbofan engine 10 having the cascade-type thrust reverser 80 as described herein, and to translate one or more fan nozzle segments 54, 56 between their stowed and deployed positions. In the VAFN actuation system 300, the pair of translating thrust reverser sleeve sections 82, 84 are movably disposed aft of the nacelle 18, and the pair of translating fan nozzle segments 54, 56 are movably disposed aft of the sleeve sections 82, 84. Each fan nozzle segment 54, 56 is positioned in its stowed and deployed positions by the VAFN actuators 370. Each VAFN actuator 370 can include a gear box 371, a telescoping coupling 373, universal joints 375, and a steady bearing 377. The telescoping coupling 373 permits fore and aft movement of the thrust reverser sleeve sections 82, 84 relative to the nacelle forward portion 18.

As shown in FIG. 7, the VAFN actuators 370 can be connected to a power drive unit (PDU) 310. Flexible drive shafts 303 and upper drive shafts 305 can rotatably connect the gear boxes 371 to the PDU 310. When actuated, the PDU 310 drives the shafts 303, 305 and interconnected gear boxes 371, thereby simultaneously actuating the VAFN actuators 370 and effecting desired simultaneous movement of the fan nozzle segments 54, 56 in a forward or aft direction.

FIG. 7 also shows a schematic representation of a control system for the VAFN actuation system 300. In the embodiment shown, each of the LVDTs 320 are connected at one end to one of the thrust reverser sleeve sections 82, 84 and at the other end to one of the fan nozzle segment 54, 56. The LVDTs 320 detect the positions of the fan nozzle segments 54, 56 relative to the thrust reverser sleeve sections 82, 84. The LVDTs 320 can be connected to an automatic control system 399 that controls operation of the PDU 210. For example, the LVDTs 320 can be operably connected to a Full Authority Digital Engine Control (FADEC) system. Inputs from the LVDTs 320 can be used by the control system 399 to monitor the position of the fan nozzle segments 54, 56, and to control operation of the PDU 310 accordingly. The positional monitoring provided by the LVDTs 320 can also be accounted for to demonstrate compliance with overall VAFN system operational and reliability requirements. Alternatively or in addition, the PDU 310 can be equipped with one or more motor sensors 380 (e.g., rotary variable displacement transformers (RVDTs)) to detect when predetermined rotational displacement limits for the PDU 310 have been reached.

To accommodate the relative motion between the translating thrust reverser sleeve sections 82, 84 and the nacelle 18, the VAFN actuation system 300 also includes telescoping wiring harness assemblies 382 to electrically connect the LVDTs 320 to the automatic control system 399. Other connection devices may also be used.

Figure 8:
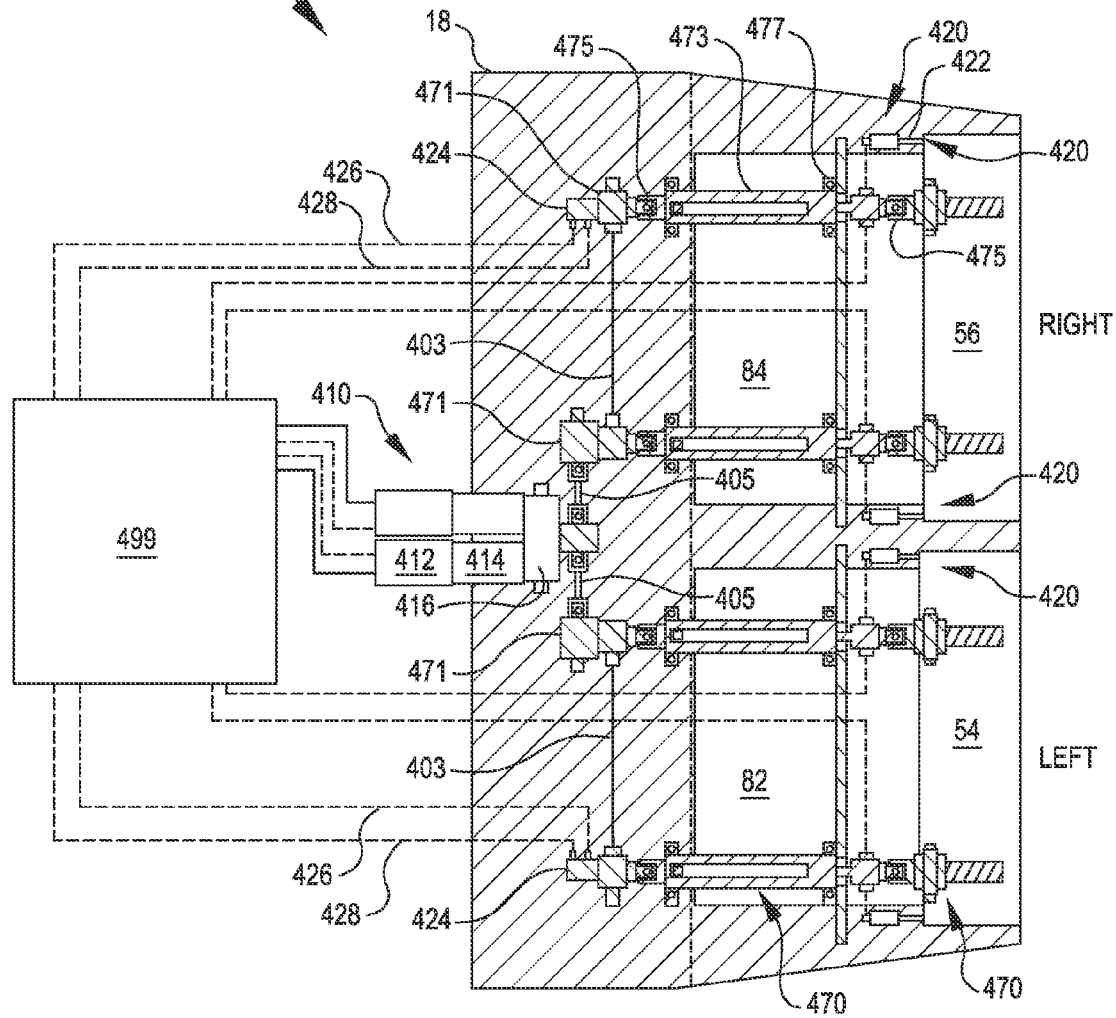
FIG. 8 is a schematic diagram showing a VAFN system that includes LVDTs attached to a nacelle forward portion to monitor the positions of VAFNs, in accordance with many embodiments.

FIG. 8 is a schematic diagram of a VAFN actuation system 400 that incorporates a plurality of VAFN actuators 470 that are connected between the thrust reverser sleeve sections 82, 84 and the fan nozzle segments 54, 56, in accordance with many embodiments. The actuation system 400 can be used in the turbofan engine 10 having the cascade-type thrust reverser 80 as described herein, and to translate one or more fan nozzle segments 54, 56 between their stowed and deployed positions. In the VAFN actuation system 400, the pair of translating thrust reverser sleeve sections 82, 84 are movably disposed aft of the nacelle 18, and the pair of translating fan nozzle segments 54, 56 are movably disposed aft of the sleeve sections 82, 84. Each fan nozzle segment 54, 56 is positioned in its stowed and deployed positions by the VAFN actuators 470. Each VAFN actuator 470 can include a gear box 471, a telescoping coupling 473, universal joints 475, and a steady bearing 477. The telescoping coupling 473 permits fore and aft movement of the thrust reverser sleeve sections 82, 84 relative to the nacelle forward portion 18.

As shown in FIG. 8, the VAFN actuators 470 can be connected to a power drive unit (PDU) 410. The PDU 410 includes two electric motors 412, two brakes 414, and a differential 416. Each of the electric motors 412 is connected with one of the brakes 414. The differential 416 receives input from both of the electric motors 412 and produces an output used to drive the VAFN actuators 470. Flexible drive shafts 403 and upper drive shafts 405 rotatably connect the gear boxes 471 to the PDU 410. To actuate the translating fan nozzle segments 54, 56, the PDU 410 drives the shafts 403, 405 and interconnected gear boxes 471, thereby simultaneously actuating the VAFN actuators 470 and effecting desired simultaneous movement of the fan nozzle segments 54, 56 in a forward or aft direction.

FIG. 8 also shows a schematic representation of a control system for the VAFN actuation system 400. In the embodiment shown, LVDTs 420 are attached to the forward nacelle portion 18 and are not attached to the fan nozzle segments 54, 56. The LVDTs 420 are also not attached to the thrust reverser sleeve sections 82, 84. Instead, the LVDTs 420 are of a spring-loaded type in which a plunger shaft 422 is contacted by a respective one of the fan nozzle segments 54, 56 when the fan nozzle segment is within a corresponding forward portion of the total range of motion of the fan nozzle segments 54, 56 relative to the nacelle forward portion 18, for example, when both the thrust reverser sleeve sections 82, 84 and the fan nozzle segments 54, 56 are in forward-most (stowed) positions relative to the forward nacelle portion 18. When the fan nozzle segments 54, 56 are disposed sufficiently aft relative to the forward nacelle portion 18 the plunger shaft 422 is not in contact with its respective fan nozzle segments 54, 56. By not attaching the LVDTs 420 to the fan nozzle segments 54, 56 or to the thrust reverser sleeve sections 82, 84, the LVDTs 420 can have a relatively small operational stroke that is not constrained by the total relative movement between the fan nozzle segments 54, 56 and the forward nacelle portion 18 or by the total relative movement between the fan nozzle segments 54, 56 and the thrust reverser sleeve sections 82, 84. In many embodiments, the operational stroke of the LVDTs 420 is selected to be significantly smaller than the total relative movement between the fan nozzle segments 54, 56 and the forward nacelle portion 18. For example, in many embodiments, the operational stroke of the LVDTs 420 is less than 25% of the total relative movement between the fan nozzle segments 54, 56 and the forward nacelle portion 18. In many embodiments, the operational stroke of the LVDTs 420 is less than 10% of the total relative movement between the fan nozzle segments 54, 56 and the forward nacelle portion 18. And in many embodiments, the operational stroke of the LVDTs 420 is less than 5% of the total relative movement between the fan nozzle segments 54, 56 and the forward nacelle portion 18.

The LVDTs 420 can be connected to an automatic control system 499 that controls operation of the PDU 410. For example, the LVDTs 420 can be operably connected to a Full Authority Digital Engine Control (FADEC) system. Inputs from the LVDTs 420 can be used by the control system 499 to determine when the fan nozzle segments 54, 56 are in their fully stowed or fully deployed positions, for example, and to control operation of the PDU 410 accordingly. The positional monitoring provided by the LVDTs 420 can also be accounted for to demonstrate compliance with overall VAFN system reliability requirements.

The VAFN actuation system 400 also includes two dual channel RVDTs 424 to provide monitoring of the actuation of the fan nozzle segments 54, 56. Each of the RVDTs 424 is operationally coupled with one of the gear boxes 471. The RVDTs 424 are disposed downstream of the flexible drive shafts 403. Each of the RVDTs 424 monitors rotation of its corresponding gear box 471. Each of the RVDTs 424 generates two signals (Channel A signal 426 and Channel B signal 428) indicative of the rotational position of the monitored gear box. The signals 426, 428 are communicated to the FADEC system and are used by the FADEC system to monitor the position of the fan nozzle segments 54, 56, and to monitor for any incompatibility between the signals 426, 428, which can be cause by, for example, a mechanical malfunction such as a broken flexible drive shaft 403. The use of dual channel RVDTs provides system redundancy that may enable the ability to dispatch an airplane with one inoperative channel.

Figure 9:
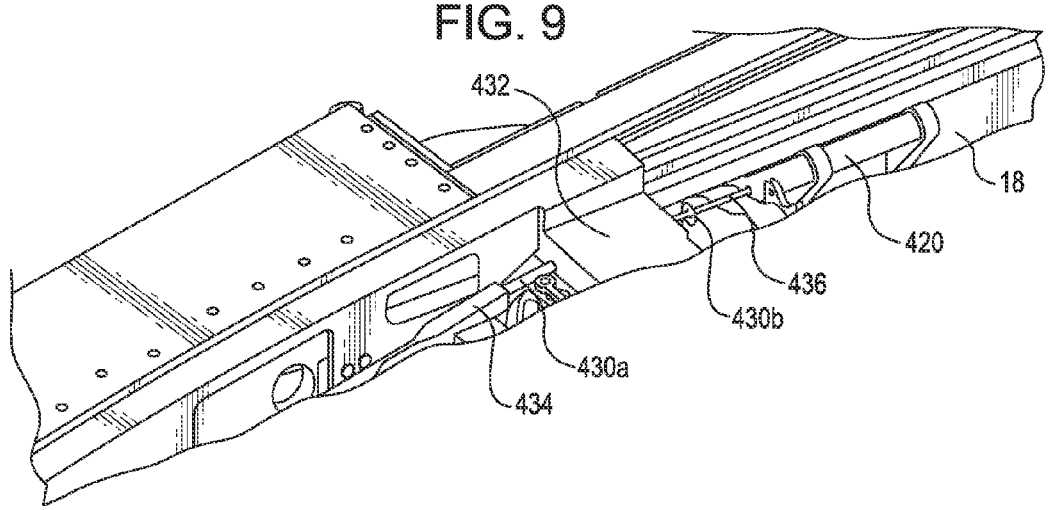
FIG. 9 is a perspective view showing a spring-type LVDT mounted to a forward nacelle portion, a spring-loaded slave link supported by a thrust reverser sleeve fitting, and a VAFN fitting contacting the slave link, in accordance with many embodiments.

FIG. 9 is a perspective view showing one of the spring-type LVDTs 420 mounted to the forward nacelle portion 18, a spring-loaded slave plunger having an aft end 430a and a forward end 430b supported by a thrust reverser sleeve fitting 432, and a VAFN fitting 434 contacting the slave plunger aft end 430a, in accordance with many embodiments. In the embodiment shown, the slave plunger aft end 430a is contacted by the VAFN fitting 434. In turn, the slave plunger forward end 430b contacts a plunger shaft 436 of the LVDT 420 and thereby the slave plunger communicates the position of the VAFN fitting 434 to the LVDT 420. The slave plunger is spring loaded and is constrained to translate along a line of action by the thrust reverser sleeve fitting 432. When the VAFN segments 54, 56 are disposed sufficiently aft from their stowed positions, a gap occurs between the slave plunger aft end 430a and the VAFN fitting 434. The spring-loaded slave plunger and the plunger 436 of the LVDT 420 are spring biased into an aft extended position so as to be positioned for detecting when the fan nozzle segments 54, 56 are returned to their stowed positions. The use of the spring-loaded slave plunger enables increased flexibility in the configuration of the thrust reverser sleeve sections 82, 84 by allowing structural elements of the thrust reverser sleeve sections 82, 84, such as the thrust reverser sleeve fitting 432 to be disposed between the LVDTs 420 and the locations on the fan nozzle segments 54, 56 used to drive the plunger 436 of the LVDT 420.

Figure 10A:
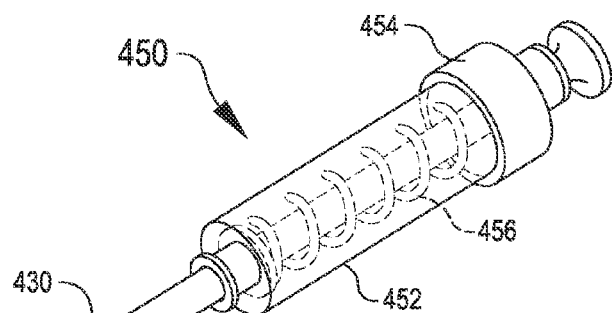
FIGS. 10A and 10B are perspective views illustrating a spring-loaded slave link assembly configured to be detachably mounted to a thrust reverser sleeve fitting, in accordance with many embodiments.
Figure 10B:
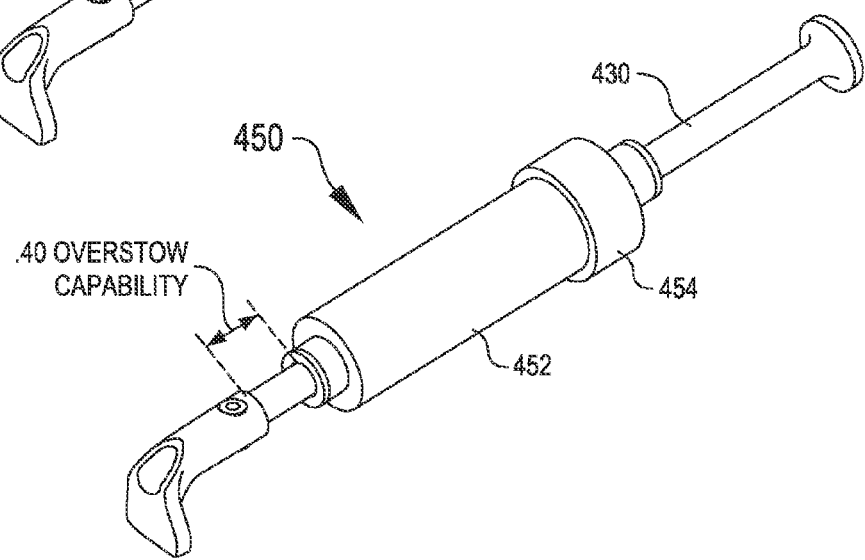
Figure 11A:
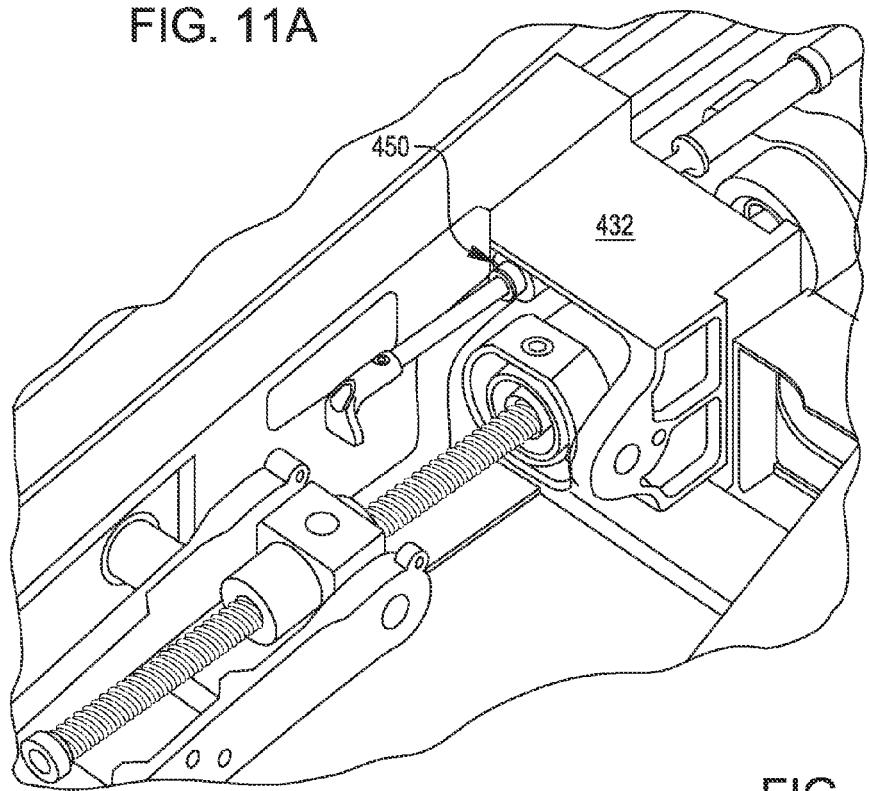
FIG. 11A is a perspective view illustrating the spring-loaded slave link assembly of FIGS. 10A and 10B mounted in a thrust reverse sleeve fitting with the VAFN in a deployed position, in accordance with many embodiments.
Figure 11B:
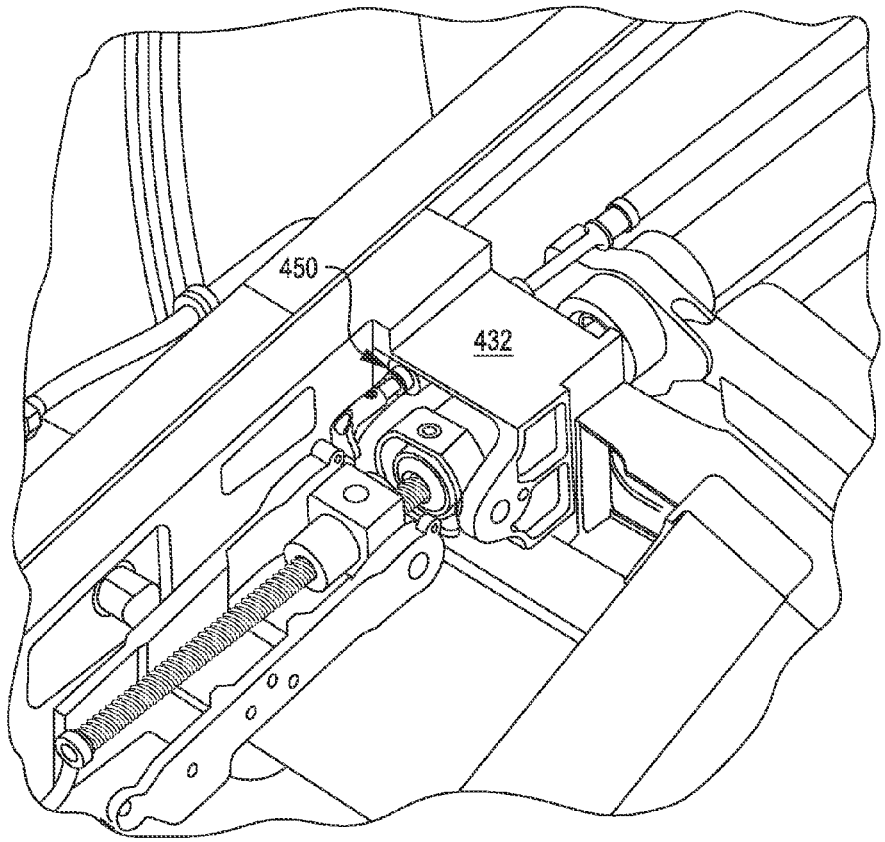
FIG. 11B is a perspective view illustrating the spring-loaded slave link assembly of FIGS. 10A and 10B mounted in a thrust reverse sleeve fitting with the VAFN in a stowed position, in accordance with many embodiments.

FIGS. 10A and 10B are perspective views illustrating a spring-loaded slave link assembly 450 configured to be detachably mounted to a thrust reverser sleeve fitting, in accordance with many embodiments. The assembly 450 provides a self-contained, easily replaceable unit that can be installed into a mounting hole in the thrust reverse sleeve fitting so as to provide a slave plunger 430 for communicating the position of the VAFN fitting 434 to the LVDT 420. The assembly 450 includes the slave plunger 430, a housing 452, an end cap 454, and compression spring 456 that interfaces with the end cap 454 and the slave plunger 430 to bias the slave plunger 430 into an extended configuration (shown in FIG. 10A) absent contact with the VAFN fitting 434. FIG. 10B shows the assembly 450 in a configuration corresponding to the nominal stowed position of the fan nozzle segments 54, 56. As illustrated, the assembly 450 is configured to allow an additional 0.40 inch stroke of the slave plunger 430, thereby allowing for variability in the stowed position of the fan nozzle segments 54, 56 relative to the nacelle forward portion 18. FIG. 11A is a perspective view illustrating the spring-loaded slave plunger assembly 450 mounted in the thrust reverse sleeve fitting 432 with the fan nozzle segments 54, 56 in a deployed position. And FIG. 11B is a perspective view illustrating the spring-loaded slave plunger assembly 450 mounted in the thrust reverse sleeve fitting 432 with the fan nozzle segments 54, 56 in the stowed position.

Figure 12A:
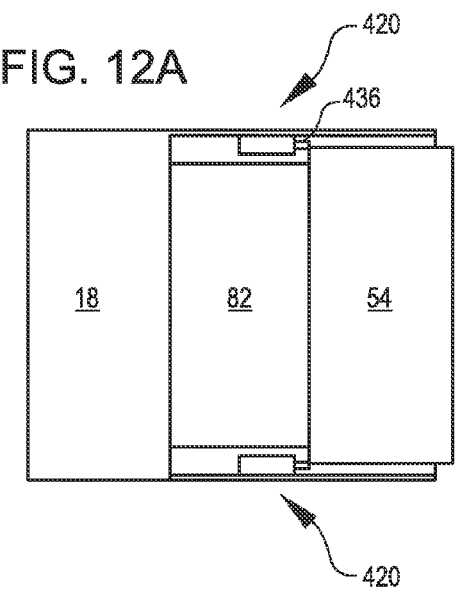
FIGS. 12A, 12B, and 12C schematically illustrate a turbofan engine nacelle that includes proximity sensors mounted to a forward nacelle portion that directly interface with a VAFN when the VAFN is in a stowed configuration, in accordance with many embodiments.
Figure 12B:
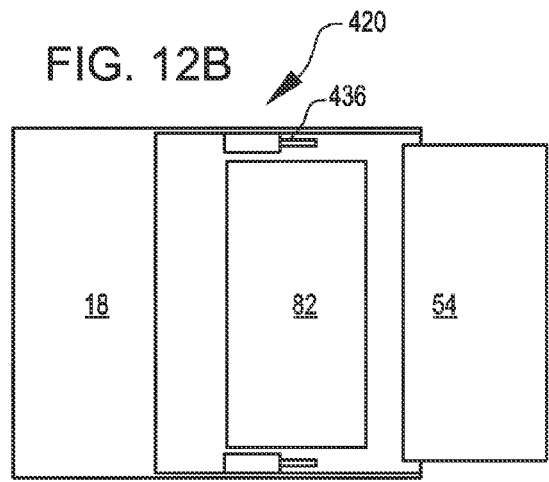
Figure 12C:
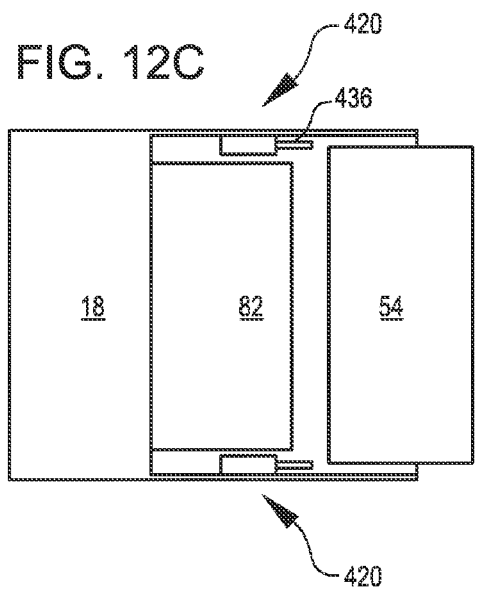

In many embodiments, one or more and even all of the LVDTs 420 can be configured and mounted to directly interface with the fan nozzle segments 54, 56 without the use of a slave link. FIGS. 12A, 12B, and 12C schematically illustrate a turbofan engine nacelle that includes proximity sensors mounted to the forward nacelle portion 18. The proximity sensors (e.g. LVDTs 420) directly sense the presence of the fan nozzle segment 54 when the fan nozzle segment 54 is in the stowed position (as illustrated in FIG. 12A). FIG. 12B illustrates clearance between the plungers 436 of the LVDTs 420 when both the fan nozzle segment 54 and the thrust reverse sleeve section 82 are in deployed positions. And FIG. 12C illustrates clearance between the plungers 436 of the LVDTs 420 when the fan nozzle segment 54 is deployed and the thrust reverse sleeve section 82 is stowed.

FIG. 13 is a simplified diagram showing acts of a method 500 for monitoring a variable area fan nozzle of a turbofan engine, in accordance with many embodiments. The nacelles, systems, and assemblies described herein can be used to perform the method 500. In act 502, during a first time period when a fan nozzle is in a stowed position relative to a movable sleeve of the engine and the sleeve is in a forward position relative to a nacelle forward portion of the engine, a first proximity sensor is used to detect the presence of the first portion of the fan nozzle (e.g., one end of the fan nozzle). The first proximity sensor is attached to the nacelle forward portion. The first proximity sensor is not attached to the fan nozzle. In act 504, a fan nozzle drive system that is operationally coupled with the fan nozzle is actuated to move the fan nozzle relative to the sleeve from the stowed position to a deployed position. In act 506, the fan nozzle drive system is actuated to return the fan nozzle from the deployed position to the stowed position. In act 508, a sleeve drive system that is operationally coupled with the sleeve is actuated to move the sleeve and the fan nozzle relative to the nacelle forward portion thereby moving the sleeve from a forward position to an aft position relative to the nacelle forward portion. In act 510, the sleeve drive system is actuated to return the sleeve from the aft position to the forward position. And in act 512, during a second time period subsequent to returning the fan nozzle to the stowed position and subsequent to returning the sleeve to the forward position, the first proximity sensor is used to detect the presence of the first portion of the fan nozzle.

FIG. 14 is a simplified diagram showing optional acts that can be accomplished in the method 500, in accordance with many embodiments. In act 514, a second proximity sensor is used to detect the presence of a second portion of the fan nozzle (e.g., the second portion being different from the first portion). The second proximity sensor is attached to the nacelle forward portion. The second proximity sensor is not attached to the fan nozzle. In act 516, a first signal generated by the first proximity sensor is compared with a second signal generated by a second proximity sensor to monitor for misalignment and/or defective positioning of the fan nozzle. For example, unbalanced articulation of the fan nozzle can cause the fan nozzle to become misaligned and/or defectively positioned relative to the thrust reverser sleeve and/or the nacelle forward portion. In act 518, a first member of the first proximity sensor is supported in a fixed position relative to the nacelle forward portion. In act 520, motion of the fan nozzle relative to the nacelle forward portion is used to articulate a second member of the first proximity sensor relative to the first member only during a subset of the total range of motion between the fan nozzle and the nacelle forward portion. In many embodiments, the subset is less than 25% of the total range of relative motion between the fan nozzle and the nacelle forward portion. The subset can be less than 10% of the total range of relative motion between the fan nozzle and the nacelle forward portion. And the subset can be less than 5% of the total range of relative motion between the fan nozzle and the nacelle forward portion. In act 522, a first signal indicative of a position of the second member relative to the first member is generated. In act 524, a slave link supported by the sleeve is used to communicate a movement of the fan nozzle to the second member of the first proximity sensor In act 526, an actuation motion is transferred from a drive source through a mechanical interconnection to a plurality of fan nozzle actuators operatively coupled with the fan nozzle. In act 528, a first configuration signal is generated that is indicative of a configuration of the mechanical interconnection at a first location, for example, via an RVDT to indicate a particular rotational configuration of a range of rotational configurations used to position the fan nozzle. In act 530, a second configuration signal is generated that is indicative of a configuration of the mechanical interconnection at a second location. In act 532, the first and second configuration signals are compared to monitor the mechanical interconnection. In act 534, the first signal generated by the first proximity sensor is compared with at least one of the first configuration signal or the second configuration signal to monitor the fan nozzle drive system downstream of at least one of the first location or the second location of the mechanical interconnection.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for monitoring a movable fan nozzle of a turbofan engine, the method comprising:
    (a) during a first time period when the fan nozzle is in a stowed position relative to a movable sleeve of the turbofan engine and the movable sleeve is in a forward position relative to a nacelle forward portion of the turbofan engine, using a first proximity sensor to detect the presence of a first portion the fan nozzle, the first proximity sensor being attached to the nacelle forward portion and not attached to the fan nozzle;
    (b) actuating a fan nozzle drive system operationally coupled with the fan nozzle to move the fan nozzle relative to the sleeve from the stowed position to a deployed position;
    (c) actuating the fan nozzle drive system to return the fan nozzle from the deployed position to the stowed position;
    (d) actuating a sleeve drive system operationally coupled with the sleeve to move the sleeve and the fan nozzle relative to the nacelle forward portion, wherein the sleeve moves from a forward position to an aft position relative to the nacelle forward portion;
    (e) actuating the sleeve drive system to return the sleeve from the aft position to the forward position;
    (f) during a second time period subsequent to (c) and (e), using the first proximity sensor to detect the presence of the first portion of the fan nozzle;
    (g) supporting a first member of the first proximity sensor in a fixed position relative to the nacelle forward portion;
    (h) using motion of the fan nozzle relative to the nacelle forward portion to articulate a second member of the first proximity sensor relative to the first member only during a subset of a total range of relative motion between the fan nozzle and the nacelle forward portion, the subset being less than 25% of the total range of relative motion; and
    (i) generating a first signal indicative of a position of the second member relative to the first member.

2. The method of claim 1, wherein:
    (a) further comprises using a second proximity sensor to detect the presence of a second portion of the fan nozzle, the second proximity sensor being attached to the nacelle forward portion and not attached to the fan nozzle; and
    (f) further comprises using the second proximity sensor to detect the presence of the second portion of the fan nozzle.

3. The method of claim 2, further comprising comparing a first signal generated by the first proximity sensor with a second signal generated by the second proximity sensor to monitor for at least one of misalignment or defective positioning of the fan nozzle.

4. The method of claim 1, comprising using a slave link supported by the sleeve to communicate a movement of the fan nozzle to the second member.

5. The method of claim 1, wherein each of (b) and (c) includes transferring an actuation motion from a drive source through a mechanical interconnection to a plurality of fan nozzle actuators operatively coupled with the fan nozzle.

6. The method of claim 5, further comprising:
    generating a first configuration signal indicative of the configuration of the mechanical interconnection at a first location;
    generating a second configuration signal indicative of the configuration of the mechanical interconnection at a second location; and
    comparing the first and second configuration signals to monitor the mechanical interconnection.

7. The method of claim 6, further comprising comparing a first signal generated by the first proximity sensor with at least one of the first configuration signal or the second configuration signal to monitor the fan nozzle drive system downstream of at least one of the first location or the second location.

8. A method for monitoring a movable fan nozzle of a turbofan engine, the method comprising:
    (a) during a first time period when the fan nozzle is in a stowed position relative to a movable sleeve of the turbofan engine and the movable sleeve is in a forward position relative to a nacelle forward portion of the turbofan engine, using a first proximity sensor to detect the presence of a first portion the fan nozzle, the first proximity sensor being attached to the nacelle forward portion and not attached to the fan nozzle;
    (b) actuating a fan nozzle drive system operationally coupled with the fan nozzle to move the fan nozzle relative to the sleeve from the stowed position to a deployed position;
    (c) actuating the fan nozzle drive system to return the fan nozzle from the deployed position to the stowed position,
    wherein each of (b) and (c) includes transferring an actuation motion from a drive source through a mechanical interconnection to a plurality of fan nozzle actuators operatively coupled with the fan nozzle;
    (d) actuating a sleeve drive system operationally coupled with the sleeve to move the sleeve and the fan nozzle relative to the nacelle forward portion, wherein the sleeve moves from a forward position to an aft position relative to the nacelle forward portion;
    (e) actuating the sleeve drive system to return the sleeve from the aft position to the forward position;
    (f) during a second time period subsequent to (c) and (e), using the first proximity sensor to detect the presence of the first portion of the fan nozzle;
    (g) generating a first configuration signal indicative of the configuration of the mechanical interconnection at a first location;
    (h) generating a second configuration signal indicative of the configuration of the mechanical interconnection at a second location;
    (i) comparing the first and second configuration signals to monitor the mechanical interconnection; and
    (j) comparing a first signal generated by the first proximity sensor with at least one of the first configuration signal or the second configuration signal to monitor the fan nozzle drive system downstream of at least one of the first location or the second location.

\* \* \* \* \*